3,236,593
PROCESS FOR THE MANUFACTURE OF A MINERAL FEED ADDITIVE ESSENTIALLY CONSISTING OF DICALCIUM PHOSPHATE

Fridolin Hartmann, Urfeld, near Bonn, Franz Rodis, Bad Hersfeld, and Josef Cremer, Hermulheim, near Cologne, Germany; Hildegard Rodis, sole heiress of said Franz Rodis, deceased, assignors to Knapsack Aktiengesellschaft, Knapsack, near Cologne, Germany
No Drawing. Filed Mar. 19, 1963, Ser. No. 266,169
Claims priority, application Germany, Jan. 16, 1960, K 39,684
7 Claims. (Cl. 23—109)

The present application is a continuation-in-part application of application Serial No. 82,736, filed January 16, 1961 and now abandoned, and relates to a method of preparing a mineral feed additive essentially consisting of dicalcium phosphate.

Dicalcium phosphate is used on a large scale as mineral additive feed. It is produced practically exclusively by decomposing bone meal or crude phosphate with acid and fractional precipitation with lime. The product thus obtained always contains a certain percentage of fluorine so that a part of the product is inter alia transformed during drying into a form difficultly soluble in ammonium citrate.

It is known to prepare dicalcium phosphate by introducing limestone powder into a phosphoric acid having a concentration of below 70% and filtering off the precipitate formed or concentrating the resulting solution by evaporation. Furthermore in view of an existing prejudice, it was previously held that the use of a phosphoric acid having a concentration of more than 70% would obligatorily lead to final products containing an extraordinarily high proportion of water-soluble phosphate i.e. monocalcium phosphate. In contradistinction thereto we have now found that the reaction between phosphoric acid and powdered limestone can be carried out without an aqueous phase being formed and without water having to be evaporated after the conversion is complete. According to the following equation

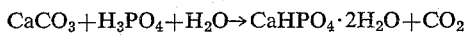
$$CaCO_3 + H_3PO_4 + H_2O \rightarrow CaHPO_4 \cdot 2H_2O + CO_2$$

the reaction of 1 mol calcium carbonate with 1 mol phosphoric acid requires exactly 1 mol water for the formation of dicalcium phosphate dihydrate as the final product.

The ratio of 1 mol 100% orthophosphoric acid to 1 mol water corresponds to an orthophosphoric acid of a strength of 84–85% by weight as produced on an industrial scale.

The process of the present invention comprises adding phosphoric acid having a concentration from 84% to 85% by weight to pulverized dry limestone in an amount to form $CaHPO_4 \cdot 2H_2O$; mixing the limestone-acid mixture while adding the acid; and ripening the product formed by heating the same at a temperature of 30–80° C. for a period of 6–48 hours.

If an acid having a still higher concentration is concerned, for example $H_3PO_4$ of up to 100% by weight strength, it can be used after having been diluted to 84–85% by weight.

The reaction is accompanied by so low a heat evolution—about 4 kilocal. per gram-mol $CaHPO_3 \cdot 2H_2O$—that the water required for the formation of the dihydrate remains practically in the powder obtained by rapidly mixing the two components.

A minor evaporation of water is desirable, especially in the event that phosphoric acid having a strength of 70 to below 84% $H_3PO_4$ is used.

It is of advantage to mix the acid rapidly, for example in a few minutes, with the limestone powder. Agglomerates are temporarily formed which continuously break up into an easily deformable mass. This plasticity is a further reason for rapid mixing since then the consolidating action of the stirring arms or of other mixing means only occurs temporarily.

A suitable mixer is, for example, a disk mixer in which the acid is distributed by a second disk rotating in countercurrent manner in the material. When the limestone powder is sufficiently agitated the acid can also be distributed by a perforated plastic nozzle. The temperature in the mixer increases to at most +70° C.

The fine grains of below 60 microns react much more rapidly than the coarser portions of the limestone powder, but the provision of too fine a powder renders the process unnecessarily expensive. It is therefore suitable to use a limestone powder containing more than 50% by weight of below 60 microns.

Even if more than 70% by weight of the limestone powder has a grain size of below 60 microns, the reaction does not take place at once, but a certain time is required for the individual limestone grains to react.

Because of the $CO_2$ content and the pH value of the powder leaving the mixer, it must be assumed that the powder still contains a little monocalcium phosphate which, as is known, is first obtained in the form of a gel that slowly transforms into the crystalline state, which fact explains the thixotropy observed in the fresh reaction mixture.

The plastic nature of the primary product shows that also when phosphoric acid directly acts on dry calcium carbonate a dicalcium phosphate containing monocalcium phosphate is produced which is transformed into a neutral product in a subsequent ripening process.

Where small quantities are concerned, the material can be caused to ripen by storing it for several days or weeks. The ripening step can be accelerated by increasing the temperature of the mass to 40–80° C.

The carbon dioxide escaping during the ripening is replaced by air. By this means the initially sticky powder particles do not become baked to a solid mass when the carbon dioxide escapes.

A slight motion of the material is advantageous. For carrying out the aforesaid steps, it is suitable to use a slowly rotating tube through which air having a temperature of 30 to 80° C. is conducted in counter-current manner to the material. In this manner a loose, mobile powder is formed after 6 to 48 hours.

When an acid having a concentration of 70 to below 84% by weight of $H_3PO_4$ is used, the plasticity of the product formed in the mixture may involve the formation of pulpy aggregates in the mixer or at the inlet into the rotating tube.

Acids of the aforesaid concentration can be used, however, when part of the limestone powder is replaced by the fines obtained on lime burning which essential consist of CaO. The reaction heat evolved by the hydration of said quicklime fines to $Ca(OH)_2$, being about ten times as high as the reaction heat of the limestone powder, removes the water in excess of stoichiometric requirements, and a powdery reaction product is obtained.

A similar effect can also be obtained by using dehydrated sodium pyrophosphate in an amount such that the water in excess is partially bound as hydrate and partially evaporated by higher reaction heat. In this case it is of advantage that the disodium phosphate, formed via the hydrate $Na_4P_2O_7 \cdot 10H_2O$, is soluble in water. Thus, the absorption rate of the mineral feed additive is increased.

Furthermore a certain content of magnesium oxide in the final product is desirable. This is often the case since the impurities of the limestone powder also includes magnesium oxide, depending on the origin of such powder. Since, however, these impurities also contain iron oxide, silicon oxide and aluminium oxide, which are harmless from a physiological point of view but reduce the content of $P_2O_5$, it is of advantage to replace part of the limestone powder by dolomite powder in an amount that is equivalent with respect to phosphoric acid. However, at most one fifth of the limestone powder should be replaced because, due to the lower reactivity of the dolomite powder, pulpy products would otherwise form in the primary mixing. These pulpy products cannot be worked up by the process of the invention.

As compared with the dicalcium phosphate produced by precipitation, the final product has the advantage that it does not give off dust. Since this property is physiologically important it has already been proposed to agglomerate the dusting dicalcium phosphate by the addition of phosphoric acid. The process of the invention does not necessitate the manufacture of the non-dusting dicalcium phosphate in the form of grains. It is possible, however, to separate from the ripened product the fraction having the desired grain size (for example 1–2 mm.) by means of a sieve and to use it directly as feed additive. An air separation into the individual grain fractions is likewise possible. In general the portions having a grain size of more than 1 mm., or 0.5 mm. respectively, are separated with a sieve, ground and then added to the bulk.

The examples show that the final product contains a little less water than corresponds to the theoretical content of the compound $CaHPO_4 \cdot 2H_2O$. Surprisingly, the temperatures below 70° C. applied in the present process already involve a dehydration of the dihydrate. This has the advantage that the $P_2O_5$ content of the final product can be increased beyond the theoretical content of the dihydrate to about 48–50% by weight of $P_2O_5$.

The content of $P_2O_5$ can be further increased beyond the theoretical content of dicalcium phosphate by the application of an amount of phosphoric acid, approximately up to 5% by weight greater than required in order to obtain $CaHPO_4 \cdot 2H_2O$, so that a small proportion of $P_2O_5$ remains in the form of calcium monophosphate. Thus the final product is quantitatively soluble in citrate and also contains a little water-soluble $P_2O_5$. By the resulting acceleration of the physiological effect, the calcium phosphate obtained by the process of the invention advantageously distinguishes from the commercial product. Alternatively, it is possible to add in the manufacture of the primary mixture an excess of limestone powder or dolomite powder over the amount equivalent to the phosphoric acid. By this step the ripening is considerably accelerated. For economical reasons said excess will be limited to 10–20% by weight of $CaCO_3$ in the final product.

The following examples serve to illustrate the invention but they are not intended to limit it thereto:

Example 1

The limestone powder used was composed of the following proportions by weight (sieve analysis):

66% having a grain size of less than 33 microns
3% having a grain size of 33–44 microns
9% having a grain size of 40–60 microns
10% having a grain size of 60–90 microns
6% having a grain size of 90–120 microns
6% having a grain size of more than 120 microns.

100 kilograms of the limestone powder were mixed within 4 minutes in a disk mixer with 106 kilograms of orthophosphoric acid of 84.5% by weight strength having a content of $P_2O_5$ of 61.2%. The primary product having a temperature of 65° C., a pH value of 4 and containing 8% by weight of $CO_2$ was removed after a reaction time of altogether about 15 minutes through a bottom discharge and filled into a rotating tube through which air at 60° C. was blown in countercurrent manner. Thus the water-vapor taken up by the air at the outlet opening of the tube could not deposit at the inlet opening.

After every 15 minutes, a further batch was discharged into the rotating tube and the corresponding amount of product—156 kilograms—was continuously discharged at the outlet opening of the tube and sieved through a 1 mm. sieve. The portions retained by the sieve were ground and added to the bulk. The time of stay in the rotating tube was 20 hours.

The final product contained by weight 41.4% of $P_2O_5$
35.5% of $CaO$
20.4% of $H_2O$
2.0% of $CO_2$ and
0.6% of impurities originating from the limestone powder.

The product had a pH value of 6 and 98% by weight of the $P_2O_5$ was soluble in citrate.

Example 2

120 kilograms of phosphoric acid of 76% by weight strength containing 55% by weight of $P_2O_5$ were distributed within 4 minutes by means of a perforated nozzle onto a mixture intensely moved in a mixer according to Example 1 and consisting of 90 kilograms of limestone powder and 5.8 kilograms of lime fines containing 95% of $CaO$. The powder formed in the mixer was then further treated in a rotating tube as described in Example 1. After 10 hours a final product, which was capable of being passed through a sieve, was obtained consisting by weight of 41.0% of $P_2O_5$
34.1% of $CaO$
1.4% of $CO_2$
22.0% of $H_2O$ and
1.4% of impurities originating from the lime.

Example 3

100 kilograms of limestone powder having a fineness as described in Example 1 were mixed with 117 kilograms of phosphoric acid of 80% strength and 9 kilograms of $Na_4P_2O_7$ were added. The product mixed in a drier of conventional construction with air at 40° C. contained the following proportions by weight 47.3% of $P_2O_5$
35.9% of $CaO$
12.6% of $H_2O$
0.4% of $CO_2$
2.7% of $Na_2O$
Rest $MgO$, $Fe_2O_3$, $SiO_2$, $Al_2O_3$ etc. after 30 hours.

Example 4

80 kilograms of limestone powder and 16 kilograms of dolomite powder having the fineness defined in Example 1 were mixed in a centrifugal mixer within 5 minutes with 100 kilograms of phosphoric acid of 85% strength. The mixed product was ventilated with air at 50° C. while being slowly agitated by means of a vertical screw stirrer. After 48 hours the product contained by weight:

44.0% of $P_2O_5$
34.4% of $CaO$
2.5% of $MgO$
17.2% of $H_2O$
1.0% of $CO_2$

We claim:

1. A process for the manufacture of a mineral feed additive consisting essentially of dicalcium phosphate wherein concentrated phosphoric acid having a concentration from 84% to 85% by weight is added to pulverized dry limestone in an amount to form $CaHPO_4 \cdot 2H_2O$, the limestone-acid mixture being mixed while adding the acid, and ripening the product formed by heating the same at a temperature of 30–80° C. for a period of 6–48 hours.

2. The process of claim 1 wherein phosphoric acid having an acid concentration from 70 to below 84% by weight is added and the acid concentration is adjusted to said 84–85% during the mixing step by combining with said limestone a dehydrating agent selected from the group consisting of sodium pyrophosphate and fines obtained from burnt lime consisting essentially of CaO in an amount corresponding to the water being in excess.

3. The process of claim 1 wherein phosphoric acid having an acid concentration within the range of more than 85 to 100% is first diluted before mixing to a concentration of 84–85%.

4. A process as claimed in claim 1 wherein at most one fifth of the limestone powder is replaced by an equivalent amount of dolomite powder.

5. A process as claimed in claim 4 wherein the dolomite powder is used in an excess of up to about 10 to 20% over the amount equivalent to the phosphoric acid.

6. A process as claimed in claim 1 wherein the $P_2O_5$ is used in an excess of up to about 5% over the theoretical content of $P_2O_5$ in the dicalcium phosphate.

7. A process as claimed in claim 1 wherein the limestone powder is used in an excess of about 10 to 20% over the amount equivalent to the phosphoric acid.

References Cited by the Examiner

UNITED STATES PATENTS

| | | | |
|---|---|---|---|
| 2,067,538 | 1/1937 | MacIntire | 71—41 |
| 2,108,940 | 2/1938 | MacIntire | 71—41 |
| 2,137,674 | 11/1938 | MacIntire | 71—64 |
| 2,739,886 | 3/1956 | Facer | 71—64 |

MAURICE A. BRINDISI, *Primary Examiner.*